I. S., I. & S. McDOUGALL.
INSECTICIDE, SHEEP DIP, VERMIFUGE, &c.
APPLICATION FILED SEPT. 8, 1911.
1,065,156.
Patented June 17, 1913.
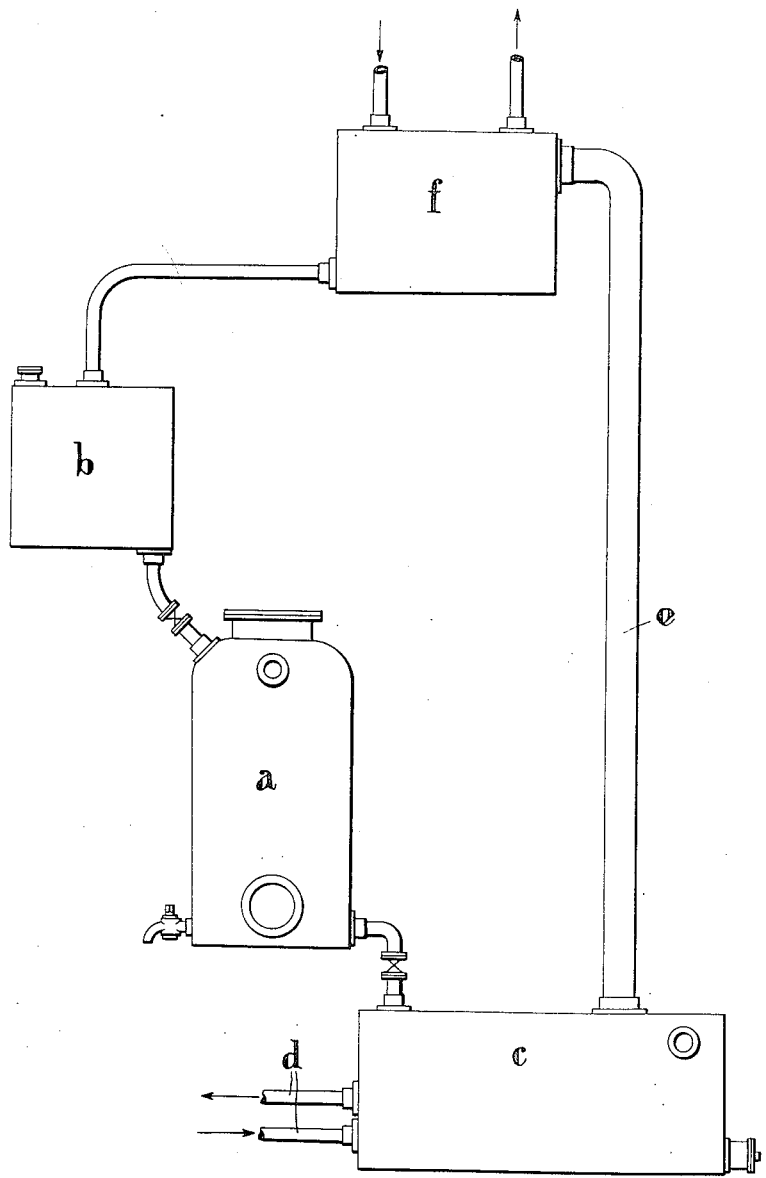

UNITED STATES PATENT OFFICE.

ISAAC SHIMWELL McDOUGALL, ISAAC McDOUGALL, AND SIDNEY McDOUGALL, OF MANCHESTER, ENGLAND.

INSECTICIDE, SHEEP-DIP, VERMIFUGE, &c.

1,065,156.      Specification of Letters Patent.      Patented June 17, 1913.

Application filed September 8, 1911. Serial No. 648,328.

*To all whom it may concern:*

Be it known that we, ISAAC SHIMWELL MCDOUGALL, ISAAC MCDOUGALL, and SIDNEY MCDOUGALL, all of 66 and 68 Port street, Manchester, in the county of Lancaster, England, have invented new and useful Improvements Relating to Insecticides, Sheep-Dip, Vermifuges, and the Like, of which the following is a specification.

This invention has for its object to provide improved means for the destruction of insects, vermin, and like parasites of various animals and plants, such means being capable of production and use in the form of a powder, paste or liquid, suitable for ready use as a sheep dip, cattle dressing, or wash for animals, and as an insecticide powder or wash for spraying upon plants, trees and other vegetable growth, and upon soil, whereby the parasitic pest is destroyed without any injury whatsoever to the animal or plant life.

The invention comprises the use of an organic salt or compound or organic salts or compounds (hereinafter termed compound) which we have obtained from the root, bark or other portions of plants, bushes or trees of the Dalbergia tribe and Derris family and such as are botanically called Derris elliptica and are known in Borneo as Tuba rabut, Tuba Tedong, and Acre (or Akar) tuba.

The said compound is obtained by extraction or other suitable method. In the manufacture of sheep dip such compound is mixed with soap, sulfur or other ingredients and made into a paste, powder or liquid in any known manner. Likewise, in the manufacture of an insecticide for use for the destruction of plant pests, the compound aforesaid may be mixed with soap, sulfur or other substances which serve as emulsifying or carrying agents.

The aforesaid compound may be used with various other carrying agents, diluents or other substances to form preparations for the destruction of earth worms, grubs and the like, and also for use as a dose for animals for the destruction of internal parasites.

The compound defies analysis but it is identified by the following color re-action:—
If a small quantity of the compound or the extract or mixture containing it, is worked up or mixed with a drop of concentrated sulfuric acid and a drop of concentrated nitric acid, a red coloration is observed which is momentarily turned to brilliant green on the addition of concentrated ammonia solution.

Referring to the accompanying explanatory drawing which illustrates diagrammatically one convenient form of apparatus for obtaining the compound aforesaid, the bark, root or other portions of the plant, bush or tree to be treated is preferably desiccated and then disintegrated or reduced to a fibrous, flocculent or powdery mass before being placed in the digester or extractor $a$. While in the said chamber, the material is acted upon by a suitable solvent, such as benzin, which removes the compound from the wood. Said solvent is supplied by the storage tank or vessel $b$ and flows through the digester $a$ to the evaporating chamber $c$ provided with steam coils $d$ or other heating means, whereby the solvent is evaporated and the compound deposited as a gummy mass in the lower portion of the evaporator. The evaporated solvent passes by way of the pipe $e$ to the condensing chamber $f$, wherein it is condensed, and is returned to the storage vessel $b$ for re-use. The process of extraction is continuous and is completed when tests of the solvent passing from the vessel $a$ show it to be pure. The compound is withdrawn from the chamber $c$ as a gummy mass and can be at once mixed with the necessary ingredients for producing the required dip, wash, insecticide or vermifuge, or may be dried and so crystallized before such use. The apparatus is provided with suitable control valves, test cocks, sighting apertures and the like.

During the manufacture of the dip, wash or insecticide we may add to the composition, a suitable water softening reagent or reagents which will serve to soften the water with which the dip or the like may be mixed for use. In like manner we may add a suitable antiseptic or bacteriacide and also a coloring matter The dip, wash, or the like may contain any desired proportion of the compound according to the class of service to which it is to be put. Or it may be diluted before use.

For the production of a sheep dip, we may employ a mixture of 5 ozs. of the compound obtained as hereinbefore described, with 1 pound of soft soap, such mixture being adapted for use with 100 gallons of water. Or 5 ozs. of the compound may be mixed with 15 ozs. of soft soap, the mixture being then absorbed into a powder by means of sulfur to make a total weight of 10 lbs. This preparation would be used with 100 gallons of water. It will of course be understood that the proportions will be varied according to the nature of the insect or parasite to be destroyed.

Our new or improved material has many important advantages over materials heretofore employed. For example, in the manufacture of insecticides for use upon plants, such substances as nicotin, arsenate of lead, and Paris green, are usually employed. Said materials are poisonous to man and animals and are liable to damage plants. But our material is innocuous to man and large animals and cannot cause injury to plants. Likewise in the manufacture of sheep dip and animal washes, arsenical preparations and mixtures of carbolic acid are used. Such materials are poisonous both to man and animals and are liable to cause injury to the skin. Our material has no irritating effect upon the skin and while very effective for destroying insects, is as before stated innocuous to man and large animals.

Having now described our invention what we claim as new and desire to secure by Letters Patent is:—

1. The herein described composition for use as an ingredient for animal washes, insecticides and vermifuges, comprising a concentrated extract of trees of the Derris family, said extract giving a red color when treated with concentrated sulfuric and nitric acids and a fugitive brilliant green color on the further addition of concentrated ammonia solution, as described.

2. The herein described composition for use as an ingredient for animal washes, insecticides and vermifuges, comprising a concentrated extract of Derris elliptica, said extract giving a red color when treated with concentrated sulfuric and nitric acids and a fugitive brilliant green color on the further addition of concentrated ammonia solution, as described.

3. The herein described composition for use as an ingredient for animal washes, insecticides and vermifuges comprising a concentrated extract of trees of the Derris family, said extract giving a red color when treated with concentrated sulfuric and nitric acids and a fugitive brilliant green color on the further addition of concentrated ammonia solution, and carrying agents, as described.

4. The herein described composition for use as an ingredient for animal washes, insecticides and vermifuges, comprising a concentrated extract of trees of the Derris family, said extract giving a red color when treated with concentrated sulfuric and nitric acids and a fugitive brilliant green color on the further addition of concentrated ammonia solution, and carrying and emulsifying agents, as described.

In testimony whereof we have signed our names to this specification in the presence of two subscribing witnesses.

ISAAC SHIMWELL McDOUGALL.
ISAAC McDOUGALL.
SIDNEY McDOUGALL.

Witnesses:
ARTHUR HUGHES,
WILLIAM CASTLE.